US009607053B2

(12) United States Patent
Baker et al.

(10) Patent No.: US 9,607,053 B2
(45) Date of Patent: Mar. 28, 2017

(54) METHODS AND SYSTEMS FOR SEARCHING AND DISPLAYING A PLURALITY OF ENTITIES WITHIN AN INTERACTIVE USER INTERFACE

(71) Applicant: EXPERT SYSTEM FRANCE, Paris (FR)

(72) Inventors: Kirk Baker, Rockville, MD (US); Archna Bhandari, Vienna, VA (US)

(73) Assignee: EXPERT SYSTEM FRANCE, Paris (FR)

( * ) Notice: Subject to any disclaimer, the term of this patent is extended or adjusted under 35 U.S.C. 154(b) by 264 days.

(21) Appl. No.: 13/973,559

(22) Filed: Aug. 22, 2013

(65) Prior Publication Data

US 2014/0059039 A1 Feb. 27, 2014

Related U.S. Application Data

(60) Provisional application No. 61/691,849, filed on Aug. 22, 2012.

(51) Int. Cl.
*G06F 17/30* (2006.01)
*G06F 7/00* (2006.01)

(52) U.S. Cl.
CPC .. *G06F 17/30554* (2013.01); *G06F 17/30991* (2013.01); *G06F 17/30864* (2013.01); *G06F 17/30867* (2013.01)

(58) Field of Classification Search
CPC ......... G06F 17/30864; G06F 17/30867; G06F 17/30554; G06F 3/04842; G06F 17/30424; G06F 17/30598; G06F 17/30696; G06F 17/3005; G06F 17/30991
See application file for complete search history.

(56) References Cited

U.S. PATENT DOCUMENTS

| 7,496,568 | B2 | 2/2009 | Broder et al. |
| 7,849,104 | B2 | 12/2010 | Sun et al. |
| 8,019,752 | B2 | 9/2011 | Ferrari et al. |
| 8,024,324 | B2 | 9/2011 | Amitay et al. |
| 8,108,439 | B2 | 1/2012 | Guo et al. |
| 2006/0161573 | A1* | 7/2006 | Dettinger .......... G06F 17/30392 |
| 2008/0294620 | A1* | 11/2008 | Churin et al. .................... 707/5 |
| 2011/0020785 | A1* | 1/2011 | Lowery, Jr. ......... G06F 19/3418 435/5 |
| 2011/0252013 | A1* | 10/2011 | Lempel et al. ............... 707/706 |
| 2011/0276423 | A1* | 11/2011 | Davidson ..................... 705/26.1 |

(Continued)

*Primary Examiner* — Dung K Chau
(74) *Attorney, Agent, or Firm* — Stradley Ronon Stevens & Young LLP

(57) ABSTRACT

Inventive systems and methods for retrieving and displaying a plurality of entities associated with a plurality of content sources in response to a search query is disclosed. In preferred embodiments of the systems and methods, the present invention addresses the need to search and relate a plurality of entities across a plurality of content sources, and then displaying the search results in an interactive user interface that simultaneously updates and modifies the display of associated entities and related content. Such searching and relationship generation for a plurality of entities across a plurality of content sources is designed to address and handle the continuing increases and growth in searchable content.

14 Claims, 4 Drawing Sheets

Selection of multiple entities within and across groups

(56) References Cited

U.S. PATENT DOCUMENTS

| | | | |
|---|---|---|---|
| 2012/0158687 A1* | 6/2012 | Fang | G06N 5/02 707/706 |
| 2013/0209067 A1* | 8/2013 | Zalewski | G09B 5/06 386/249 |
| 2013/0293776 A1* | 11/2013 | Shih-Fu et al. | 348/468 |

* cited by examiner

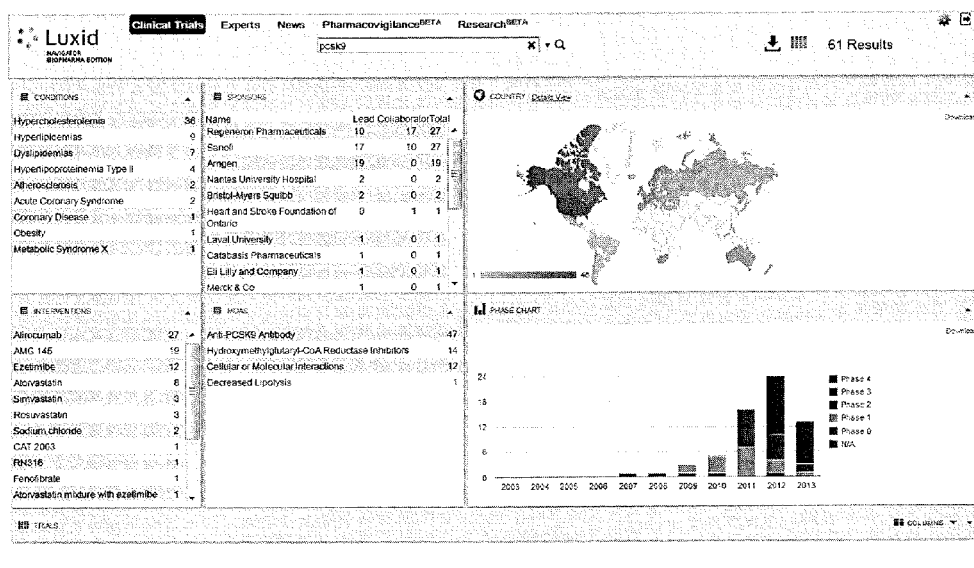
Figure 1 - Display of entities that are associated with a set of clinical trials that were retrieved by a text search

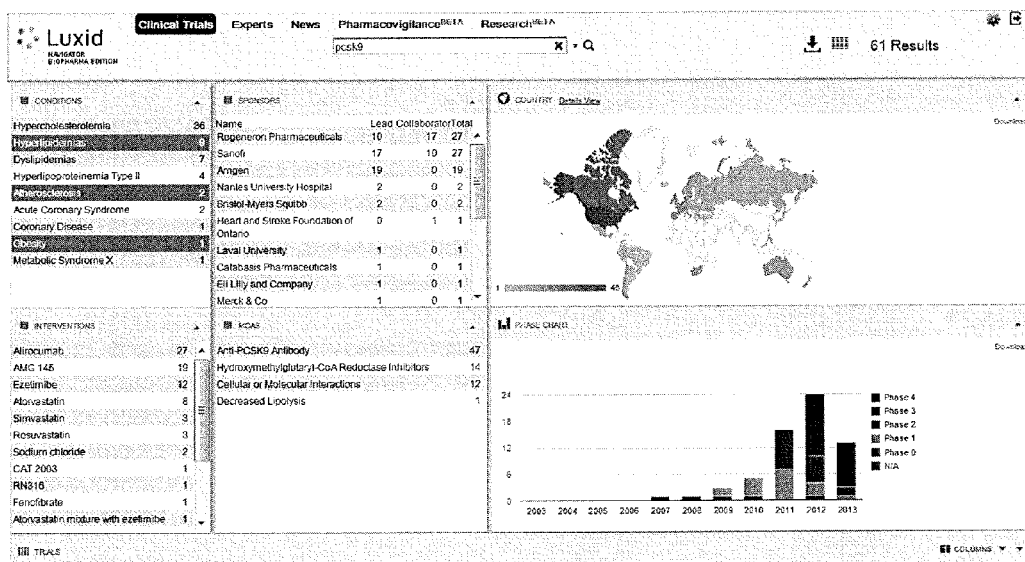
Figure 2 - Selection of multiple entities within a group

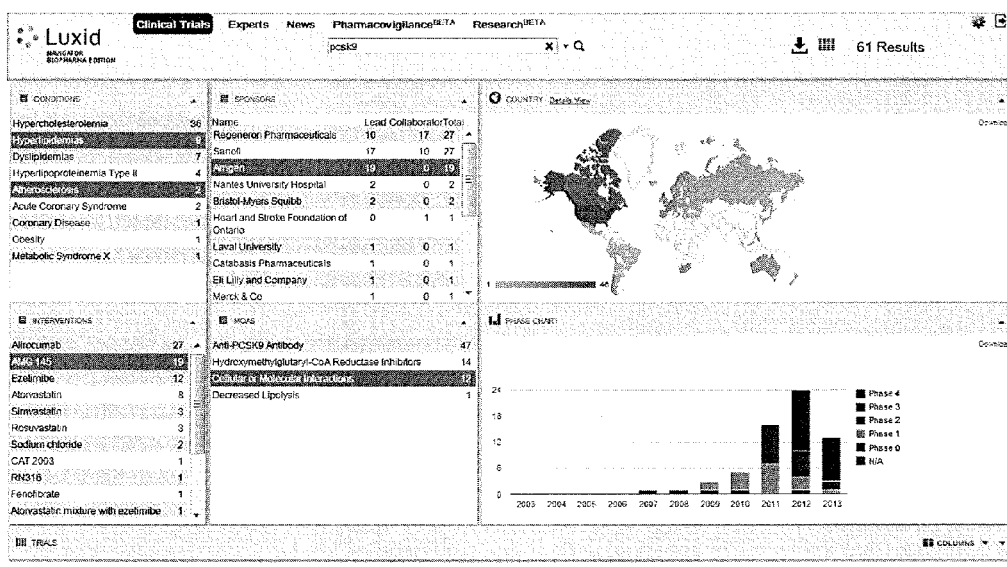
Figure 3 - Selection of multiple entities within and across groups

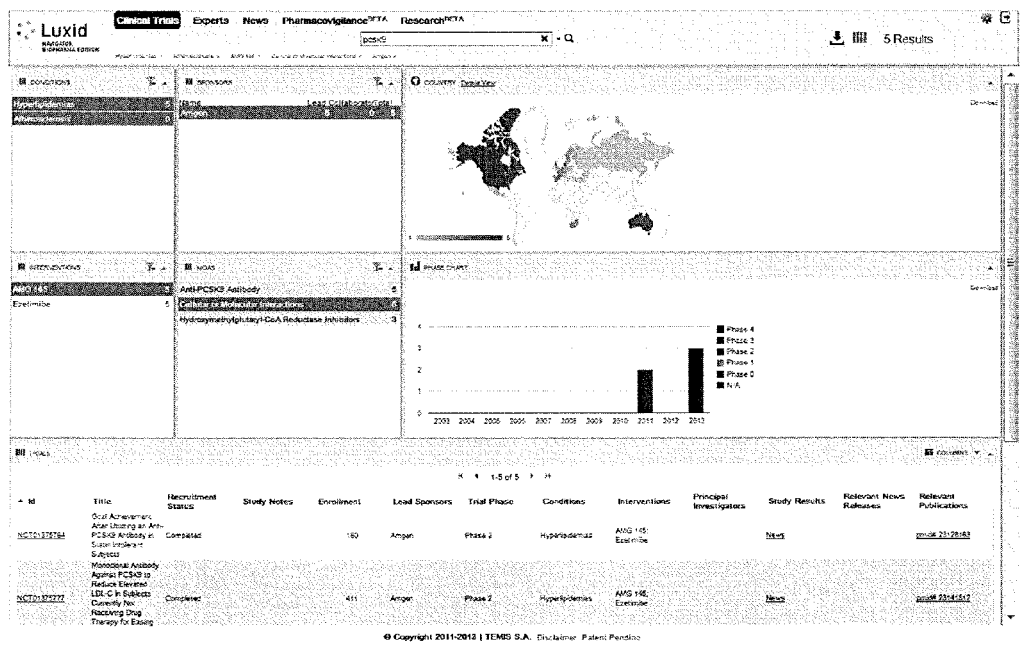
Figure 4 - Search results and related entities are modified

METHODS AND SYSTEMS FOR SEARCHING AND DISPLAYING A PLURALITY OF ENTITIES WITHIN AN INTERACTIVE USER INTERFACE

FIELD OF THE INVENTION

The present invention relates generally to the field of search engines and, in more particularity, to methods and systems for conducting search requests for entities across different content sources and for then displaying such results. More specifically, the inventive methods and systems relate to, in preferred embodiments, searching for a plurality of entities across a plurality of different content sources, and displaying the results in an interactive user interface.

BACKGROUND OF THE INVENTION

As information and the depth of content, along with the number and type of content sources available through the Internet and through public and private databases continues to expand and grow, it becomes increasingly difficult and time-consuming for users to connect and relate information from one content source to another. Although search results from one content source may refer to the same entities or events that occur in, or are accessible from a different content source, using current searching systems and methods, it is left to the user to search through the multiple content sources separately and perform the subsequent work necessary to extract related information about the identified or selected entities (or events) from each content source, and to then relate or link the results together. As the amount of information and content that is available continues to grow and expand, such effort on the part of users to relate retrieved information becomes ever more time-consuming, and is at times, prohibitive in terms of complexity.

Although systems and methods exist which are capable of displaying entities or events that have been extracted from documents or information sources, current systems and methods still fail to provide a way for users to select entities or groups of entities that are related to each other and to then simultaneously update the display or view of the related entities. Moreover, current systems and methods also fail to provide users an efficient means to refine a set of results that are associated with those entities, in order to provide for more detailed and focused search results.

While current information retrieval systems use a facet-based approach to allow users to filter result sets with respect to a pre-defined categorization of the content, these systems are limited by the fact that the facets used typically rely on a characterization of a data set that is specific to one data set. More particularly, the facets used on one data set or content source are not compatible with other data sets or content sources.

Examples of systems using particular facet-base searches, that are likely incompatible with other data sets, are described in, by way of example, U.S. patent application Ser. No. 12/757,227 by Lempel et al., for a System and Method for Selecting Search Results Facets; U.S. patent application Ser. No. 12/261,382 by Guo et al., for a Method and Device for Displaying and Browsing a Multi-Faceted Data Set; and U.S. patent application Ser. No. 12/164,139 by Amitay et al., for Information Retrieval With Unified Search Using Multiple Facets. Each of these systems, methods and devices appear to be limited as described above to particular data sets or content sources as a function of the facets recognized by the system or method.

The current methods and systems described in this application address the need for computer searching and retrieving applications that are capable of relating entities across different content sources and then displaying the search results in an interactive user interface. Moreover, the current inventive methods and systems, provide for the capability such that where selecting one or more of those entities modifies the display of related entities and the display of related content.

SUMMARY OF THE INVENTION

The present invention overcomes the disadvantages of the prior art and fulfills the needs described above by providing a method for retrieving and displaying a plurality of entities in response to a search query, said plurality of entities being related to a plurality of content sources, using a computer processor, the method comprising the steps of (a) receiving a search query from at least one user; (b) retrieving a set of search content results; (c) retrieving a plurality of entities from said searched content; (d) arranging the plurality of entities into groups; (e) displaying groups of the plurality of entities; (f) providing means to select a plurality of entities within a desired group; (g) displaying the selected plurality of entities from within said desired group; (h) indicating and displaying the entities that are related to other entities; (i) conjoining said selected plurality of entities within a group; (j) conjoining said selected plurality of entities across groups; (k) updating the search results based upon the user-selected entities and the conjoining of selected plurality of entities; (l) updating the related entities in response to a user-selection; (m) displaying the retrieved content; and (n) updating the associated entities and displaying such entities.

In further embodiments, the invention provides a system for retrieving and displaying a plurality of entities related to a plurality of content sources in response to a search query, comprising a plurality of computer processors communicatively linked to a plurality of users, wherein the plurality of computer processors implement the method steps of (a) receiving a search query from at least one user; (b) retrieving a set of search content results; (c) retrieving a plurality of entities from the searched content; (d) arranging the plurality of entities into groups; (e) displaying groups of the plurality of entities; (f) providing means to select a plurality of entities within a desired group; (g) displaying the selected plurality of entities from within said desired group; (h) indicating and displaying the entities that are related to other entities; (i) conjoining selected plurality of entities within a group; (j) conjoining selected plurality of entities across groups; (k) updating the search results based upon the user-selected entities and the conjoining of selected plurality of entities; (l) updating the related entities in response to a user-selection; (m) displaying the retrieved content; and (n) updating the associated entities and displaying such entities.

Other features and advantages of the present invention are provided in the following detailed description of the invention, which refers to the accompanying drawings.

BRIEF DESCRIPTION OF THE DRAWINGS

FIG. 1 is an exemplary display for the user to see retrieved entity information as associated with a set of clinical trials;

FIG. 2 is an exemplary display for the user to see a selection of multiple entities within a group;

FIG. 3 is an exemplary display for the user to see a selection of multiple entities within and across a plurality of groups; and FIG. 4 is an exemplary display for the user to see search results where the related entities are modified, and distinctly showing the previous selected entities from the entities that have been updated in response to the user's updated entity selection.

DETAILED DESCRIPTION OF PREFERRED EMBODIMENTS

The searching and retrieving of entity information is used by many industries and businesses. "Entity" information may include, without limitation, people (e.g., experts, doctors, lawyers, scientists, engineers, and other similar individuals), companies or business entities, medical conditions, medical interventions, medical and non-medical compositions (e.g., pharmaceuticals, drugs, materials), and many other topics of interest. Given the availability and rapid growth of information content sources, primarily through on-line sources, that provide information about "entities," the searching for entity information across the growing number of, and size of content sources, is highly complex. "Content" sources may include, without limitation, news articles, press-releases, printed and electronic publications, treatises, clinical trials documents, clinical trials results, grants and grant applications, patents and patent applications, and many other similar sources of information.

As is generally understood, entities are typically associated with documents or with other information content types. By way of example, entities may be associated with one or more original data sources (e.g., a clinical trials document that comes with an associated set of medical conditions, principal investigators, or medical treatments). Alternatively, entities may be associated together by means of automatically extracting (e.g., by text mining or named entity recognition algorithms) the entity information from content sources. The ability to search and retrieve entity information irrespective of whether the entity information is associated with data sources or associated with content sources is addressed, and the prior art problems are resolved, using the inventive methods and systems.

More particularly, the inventive method allows for retrieving and displaying a plurality of entities related to a plurality of content sources in response to a user's single (or multiple) search query. In a preferred embodiment of the inventive methods, implemented through use of one or more computer processors, the following steps are performed.

First, one or more users enter a desired search query seeking results relating to or about one or more entities. The users may also enter a selection or description of the content sources to be searched. The method and system retrieves entity or entities related information from a search of selected or identified content sources. Next the plurality of entities are arranged into associated groups based upon input from the user, or relevant associations between the entity information. The groups or plurality of entities are next displayed for the user to review. As shown in FIG. 1, an exemplary display of retrieved entity information as associated with a set of clinical trials is illustrated. The FIG. 1 display is but one example of a display format and content layout that may be used to present information to the user.

The inventive methods and systems next permit the user to identify or select a sub-plurality of entities from within one or more of the groups of entities. In preferred embodiments, these identified or selected sub-pluralities of entities are able to be displayed to the user for further review and analysis. As part of the display, and to show the user the relevant entity associations, the method indicates how the identified entities are related to other entities. FIG. 2 provides an exemplary display of a selection of multiple entities within a group. As noted, this FIG. 2 display is but one example of a display format and content layout, and many other display formats may be implemented and be equally effective.

The inventive methods and systems further permit, in preferred embodiments, the user to conjoin selected entities within or across a group of entities using "AND" or "OR" type Boolean logic sorting. In other preferred embodiments, the user is also able to conjoin entities across a group of entities using similar "AND" or "OR" type logic sorting. Such "AND" logic entails using an algorithm for joining multiple selections of entities where the sorting logic is to restrict the result set to content that contains all selected entities. The "OR" logic entails using an algorithm for joining multiple selections of entities by restricting the result set to content that contains any of the selected entities. FIG. 3 provides an exemplary display of a selection of multiple entities within and across groups. As noted, this FIG. 3 display is but one example of a display format, and many other display formats may be implemented and be equally effective.

The inventive methods and systems next are able to automatically update the search results and displayed results based upon the user selected entities, and the user selected grouping based upon the above logic type sorting. Such updating of results includes refreshing or revising the associations between the entity information, and revising the display showing the associations between the entity information, including any associations between content sources. Upon review and analysis of the retrieved and displayed results, the inventive methods and systems allow the user to update, revise or correct input queries, and to then automatically update the entities results and associated display of the entities information retrieved.

In a preferred embodiment of the inventive systems, entity information, as retrieved, may be stored in one or more databases. Such databases may include formats and systems such as SQL, no-sql, full-text index, XML file, flat file, or other similar file types and formats. As described above, the storage of the entity information is made with the association of each entity to its respective content source. As described above, after the entity information is retrieved and stored, the users can then search the stored content in order to retrieve a set of sub-results and associated entities.

In further preferred embodiments of the inventive method, as described above, once entity information is retrieved and displayed, users can then modify a results set by selecting a plurality of entities. By way of example, a user is able to select a plurality of entities within a group, which could be specific company names, in order to filter the results set to those documents associated with the selected company names. The inventive methods and systems are then able to automatically update or modify the display of entities information as the user selects desired entities within a group. More specifically, selecting one or more entities automatically modifies the display of entities that are themselves associated with the selected entities.

In other preferred embodiments of the present inventive methods and systems, users are also able to select entities from different entity types in order to filter the results sets. By way of example for such selections, the user may identify specific company names and/or specific drug names to refine a search result. As described above, selecting entities from different entity types may modify the results set to display only the content that is associated with some combination of all of the selected entities. Moreover, the system will also display to the user which entities were previously selected and which entitities have been modified in the result set as a result of selecting the related entities. This may be displayed in various ways, with one example as shown in FIG. 4, which shows search results where the related entities are modified, and distinctly shows the previous selected entities from the entities that have been updated in response to the user's updated entity selection.

While the present invention is described herein with reference to illustrative embodiments for particular applications, it should be understood that the invention is not limited to those specific examples. Those having ordinary skill in the art and access to the teachings provided herein will recognize additional modifications, applications, embodiments and substitution of equivalents all of which are within the scope of the invention. Accordingly, the invention is not to be considered as limited by the foregoing description.

What we claim is:

1. A method for retrieving and displaying a plurality of entities in response to a search query, said plurality of entities being related to a plurality of content sources, using a computer processor, the method comprising the steps of:
    a. receiving a search query from at least one user;
    b. retrieving a set of search content results;
    c. retrieving a plurality of entities related to a plurality of content sources from said set of search content results, at least a portion of the plurality of entities being related to clinical trials;
    d. arranging the plurality of entities into a plurality of groups;
    e. displaying the plurality of groups of the plurality of entities using an interactive user interface, the interactive user interface displaying one of the plurality of groups to include a list of medical interventions;
    f. providing means to select from a plurality of entities within each of the plurality of groups with the interactive user interface;
    g. selecting a plurality of entities in at least two of the plurality of groups from the interactive user interface;
    h. displaying the plurality of entities selected in step g.;
    i. conjoining the plurality of entities selected in step g.;
    j. updating the search results based upon the plurality of entities selected in step g., and the conjoining of the plurality of entities selected in step g.;
    k. indicating and displaying additional entities related to the plurality of entities selected in step g. based on the search results updated in step j.; and
    l. displaying, with the interactive user interface, content related to the plurality of entities selected in step g. and the additional entities.

2. The method for retrieving and displaying a plurality of entities in response to a search query, as described in claim 1, wherein the step (i) conjoining the plurality of entities uses AND-type Boolean logic.

3. The method for retrieving and displaying a plurality of entities in response to a search query, as described in claim 1, wherein the step (i) conjoining the plurality of entities uses OR-type Boolean logic.

4. The method for retrieving and displaying a plurality of entities in response to a search query, as described in claim 1, wherein the plurality of entities arranged into the plurality of groups are related to clinical trials.

5. The method for retrieving and displaying a plurality of entities in response to a search query, as described in claim 1, wherein the plurality of entities arranged into the plurality of groups are related to a plurality of medical conditions.

6. The method for retrieving and displaying a plurality of entities in response to a search query, as described in claim 1, wherein the step (i) conjoining the plurality of entities uses AND and OR-type Boolean logic.

7. The method for retrieving and displaying a plurality of entities in response to a search query, as described in claim 1, wherein the interactive user interface displays one of the plurality of groups to include a list of medical conditions.

8. A system for retrieving and displaying a plurality of entities related to a plurality of content sources in response to a search query, comprising:
    a plurality of computer processors communicatively linked to a plurality of users, wherein the plurality of computer processors implement the method steps of:
    a. receiving a search query from at least one user;
    b. retrieving a set of search content results;
    c. retrieving a plurality of entities related to a plurality of content sources from the set of searched content results, at least a portion of the plurality of entities being related to clinical trials;
    d. arranging the plurality of entities into a plurality of groups;
    e. displaying the plurality of groups of the plurality of entities using an interactive user interface, the interactive user interface displaying one of the plurality of groups to include a list of medical interventions;
    f. providing means to select from a plurality of entities within each of the plurality of groups with the interactive user interface;
    g. selecting a plurality of entities in at least two of the plurality of groups from the user interface;
    h. displaying the plurality of entities selected in group g.;
    i. conjoining the plurality of entities selected in step g.;
    j. updating the search results based upon the plurality of entities selected in step g., and the conjoining of the plurality of entities selected in step g.;
    k. indicating and displaying additional entities related to the plurality of entities selected in step g. based on the search results updated in step j.; and
    l displaying, with the interactive user interface, content related to the plurality of entities selected in step g. and the additional entities.

9. The system for retrieving and displaying a plurality of entities related to a plurality of content sources in response to a search query, as described in claim 8, wherein the step (i) conjoining the plurality of entities uses AND-type Boolean logic.

10. The system for retrieving and displaying a plurality of entities related to a plurality of content sources in response to a search query, as described in claim 8, wherein the step (i) conjoining the plurality of entities uses OR-type Boolean logic.

11. The system for retrieving and displaying a plurality of entities related to a plurality of content sources in response to a search query, as described in claim 8, wherein the plurality of entities arranged into the plurality of groups are related to clinical trials.

12. The system for retrieving and displaying a plurality of entities related to a plurality of content sources in response to a search query, as described in claim 8, wherein the plurality of entities arranged into the plurality of groups are related to a plurality of medical conditions.

13. The system for retrieving and displaying a plurality of entities related to a plurality of content sources in response to a search query, as described in claim 8, wherein the step (i) conjoining the plurality of entities uses AND and OR-type Boolean logic.

14. The system for retrieving and displaying a plurality of entities related to a plurality of content sources in response to a search query, as described in claim 8, wherein the interactive user interface displays one of the plurality of groups to include a list of medical conditions.

* * * * *